(12) United States Patent
Lin

(10) Patent No.: US 8,137,231 B2
(45) Date of Patent: Mar. 20, 2012

(54) AUTOMATIC TRANSMISSION FOR ELECTRIC VEHICLE HUB

(75) Inventor: Xiang-Yi Lin, Wendeng (CN)

(73) Assignee: Fairly Bike Manufacturing Co., Ltd., Taipei Hsien (TW)

( * ) Notice: Subject to any disclaimer, the term of this patent is extended or adjusted under 35 U.S.C. 154(b) by 917 days.

(21) Appl. No.: 12/219,030

(22) Filed: Jul. 15, 2008

(65) Prior Publication Data
US 2009/0026727 A1   Jan. 29, 2009

(30) Foreign Application Priority Data
Jul. 23, 2007 (CN) .................. 2007 2 0169834 U

(51) Int. Cl.
*F16H 3/74* (2006.01)
(52) U.S. Cl. ......... 475/258; 475/267; 475/293; 475/342
(58) Field of Classification Search .......... 475/258, 475/261, 267, 293, 342
See application file for complete search history.

(56) References Cited

U.S. PATENT DOCUMENTS
1,727,985 A * 9/1929 Jones ............................. 475/258
2,939,344 A * 6/1960 Harris ........................... 475/159
* cited by examiner

*Primary Examiner* — Sherry Estremsky
(74) *Attorney, Agent, or Firm* — Bacon & Thomas, PLLC

(57) ABSTRACT

An automatic transmission for an electric vehicle hub includes an external motor rotor fixedly connected with a motor shaft; a sun gear; at least three first planet gears; and at least three second planet gears coaxially fixed with the corresponding first planet gears and which are engaged with the sun gear. The first and the second planet gears are respectively engaged with first and second internal gears, and the second internal gear has a diameter greater than that of the first internal gear. The rotating disk is arranged between the first internal gear and the second internal gear, and a hub is fixed to exterior of the rotating disk. The automatic transmission further includes a clutch device, making the rotating disk and the first internal gear contact with each other for a transmission of slower rpm, and when the rpm reaches critical, at a high-speed rotation.

10 Claims, 5 Drawing Sheets

AUTOMATIC TRANSMISSION FOR ELECTRIC VEHICLE HUB

BACKGROUND OF THE INVENTION

1. Field of the Invention

The present invention relates to a transmission for vehicles, more particularly, to an automatic transmission for electric bicycle hubs.

2. Description of Related Art

In Chinese Patent Application No. CN2740439, filed by the same inventor and published on Nov. 16, 2005, an automatic transmission for an electric vehicle hub has been disclosed. In the prior art transmission structure, when the clutch device stays at an overdrive engagement status, particularly at a low-speed status, the overdrive engagement is not sufficiently sensitive. As such, a significant noise occurs from inside of the transmission, due to a great friction incurred between the clutch fork and the ratch, so that wearing out takes place therebetween.

SUMMARY OF THE INVENTION

An object of the present invention is to provide an automatic transmission for electric vehicle hubs, having merits on sensitive overdrive engagement engagement, simple structure, low noise, and long life of use.

To solve the problems, as mentioned above, the present invention is to realize a technical aspect for the automatic transmission for electric vehicle hubs, comprising: an external motor rotor fixedly connected with a motor shaft; a sun gear; three or more first planet gears which are arranged circumferentially around the sun gear; and corresponding second planet gears coaxially fixed with the respective first planet gears. The first and second planet gears are engaged and transmitted along with first and second internal gears. The second internal gear has a diameter greater than that of the first internal gear. A rotating disk is arranged between an external circumferential surface of the first internal gear and an internal circumferential surface of the second internal gear. A hub is fixed to exterior of the rotating disk. A clutch device is further included in the automatic transmission according to the present invention. The clutch device makes the rotating disk and the external circumferential surface of the first internal gear contact with each other for a transmission of slower rpm. When the rpm reaches critical, the rotating disk and the internal circumferential surface of the second internal gear contact with each other at a high-speed rotation.

According to the present invention, the clutch device includes the rotating disk, where internal and external circumferences of the rotating disk are, symmetrically, provided with recesses receiving springs and steel pins. The rotating disk is also connected with fly weights having a pinion and spring pieces, and with an annular link engaged with the pinion. There are three recesses provided at the internal and external circumferences of the rotating disk, symmetrical with and spaced from one another at 120°.

The annular link is provided, symmetrically, with full teeth or curved teeth.

There are grooves provided, between corresponding gears, among the sun gear, the first planet gears, the second planet gears, the first internal gear, and the second internal gear, where rings are disposed in the grooves.

The automatic transmission, according to the present invention, achieves technical results, namely: The external motor rotor drives the sun gear, which is fixed to the external motor rotor, for rotation. Since the sun gear is engaged with the second planet gear, the first and second planet gears, which are fixed together, can be rotated together. The first planet gear and the first internal gear are engaged with each other, and so are the second planet gear and the second internal gear. However, since the first internal gear has an internal diameter less than that of the second internal gear, the first internal gear rotates slower than the second internal gear. Further, since the steel pins disposed in the three recesses of the internal circumferential surface of the rotating disk are biased by the springs against the external circumferential surface of the first internal gear, and that the steel pins in the three recesses of the external circumferential surface of the rotating disk are pressed down by the ratches of the fly weight so as to be disengaged from an internal circumferential surface of the second internal gear, making the second internal gear idle running. When the automatic transmission, according to the present invention, reaches to a predetermined rpm, the three fly weights, under the action of centrifugal force, through engagement with the annular link and overcome resistance of the spring pieces for a synchronous rotation. The ratches are lifted up and release the pressure against the steel pins, making the steel pins return to the narrower ends of the recesses by the spring action. The steel pins touch the internal circumferential surface of the second internal gear which run speedily, so that the rotating disk can be rotated speedily. Whereas since the first internal gear, which rotates slowly, stays at an overdrive engagement with the steel pins at the recesses of the internal circumferential surface of the rotating disk. Further, since the hub is fixed on exterior of the rotating disk, the hub can be expedited automatically for a speedy rotation. In case resistance increases and speed decreases, controlling handle or switch can be shifted backward, and re-started. This will make the fly weights subject to action of the spring pieces, due to decrease of the centrifugal force, and return to an initial position, and through depression of the ratches, so that the steel pins can be fully disengaged from the internal circumferential surface of the second internal gear. As a result, the automatic transmission, according to the present invention, can achieve the purpose of automatic speed increase or decrease. In addition, the automatic transmission is simple in structure, and sensitive in clutching action, let alone noise is reduced and wearing out of parts is less possible, resulting in a longer life of use for the automatic transmission.

Other objects, advantages, and novel features of the present invention will become more apparent from the following detailed description when taken in conjunction with the accompanying drawings.

BRIEF DESCRIPTION OF THE DRAWINGS

FIG. 3 is a schematic view illustrating a rotating disk as shown in

FIG. 2;

DETAILED DESCRIPTION OF THE PREFERRED EMBODIMENTS

Figure 1:
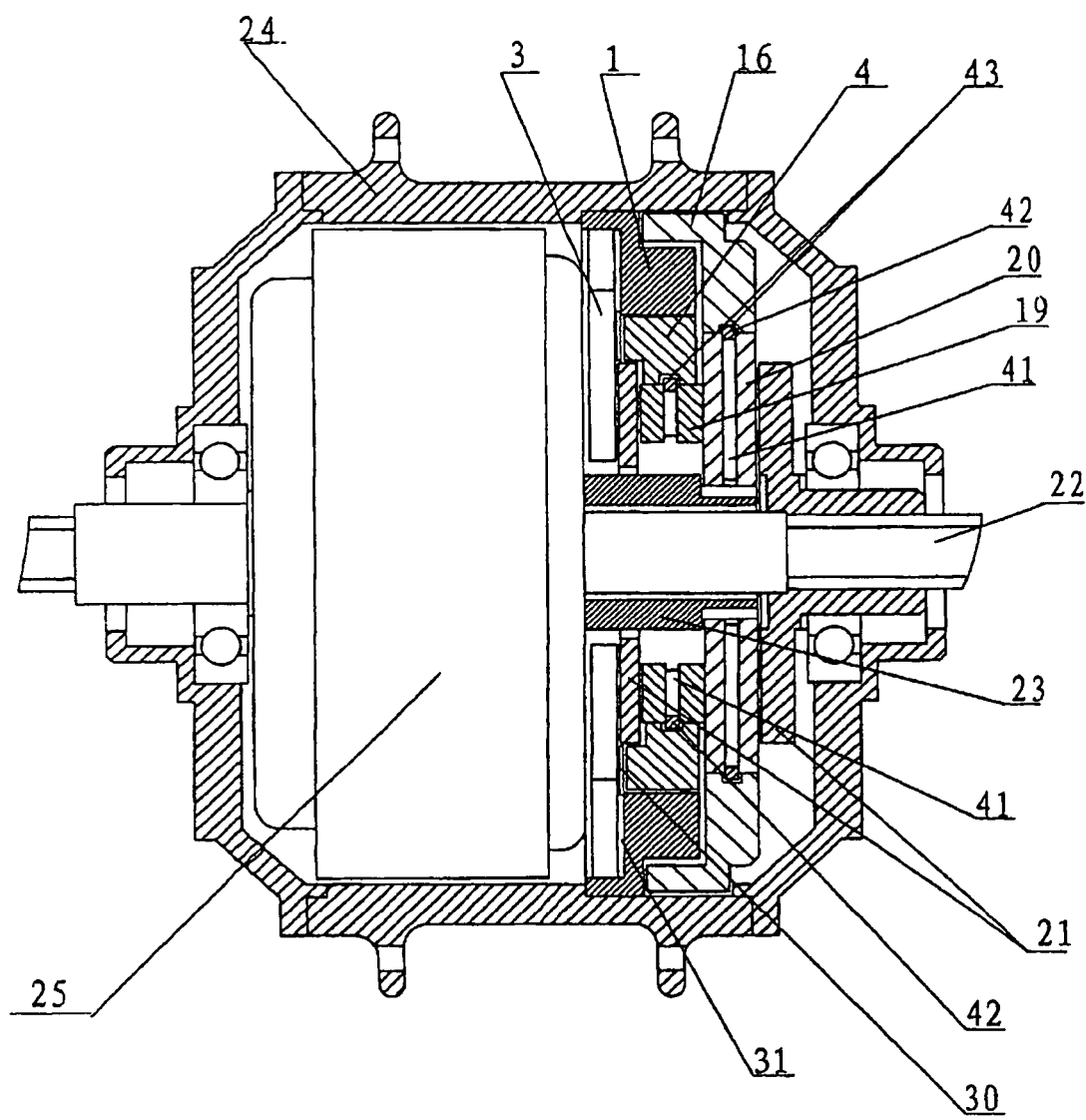
FIG. 1 is a cross-sectional view illustrating an automatic transmission for an electric vehicle hub according to the present invention.
Figure 2:
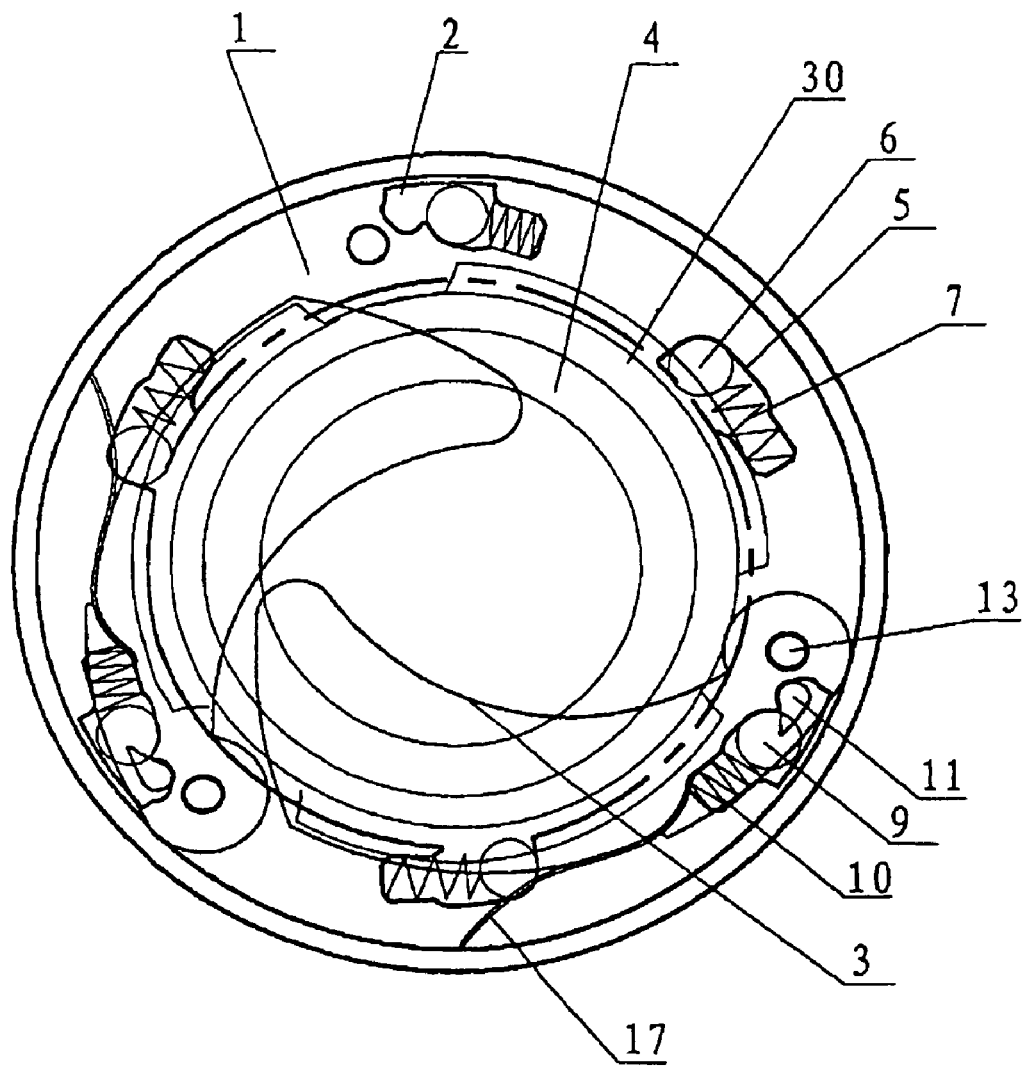
FIG. 2 is a schematic view illustrating a clutch device of the automatic transmission according to the present invention, in which two fly weights are exemplified.

Referring to FIGS. 1 and 2, an automatic transmission for an electric vehicle hub comprises an external motor rotor 25, a sun gear 23, planet gears 19, 20, internal gears 4, 16, a planetary frame 21, a rotating disk 1, flying weights 3 (totally three, though only two are shown), an annular link 30 passing through and fixed to a motor shaft 22, where the planetary frame 21 is fixed with the motor shaft 22. Three second planet gears 20 (only two are shown) having external teeth are provided, circumferentially and equiangularly along the planetary frame 21, where each second planet gear 20 is coaxially fixed with the corresponding first planet gear 19 having external teeth. Each first planet gear 19 has a diameter less than that of the corresponding second planet gear 20. The external motor rotor 25 rotates the sun gear 23 which is fixed on the motor shaft 22. The three second planet gears 20, the sun gear 23, and a second internal gear 16 are engaged with one another for rotation. Each of the first planet gears 19 is not engaged directly with the sun gear 23, but rather are driven by the corresponding second planet gear 20 for a synchronous and coaxial rotation therewith. External surface teeth of the first planet gears 19 are engaged with a first internal gear 4. However, since the first internal gear 4 has an internal diameter less than that of the second internal gear 16, the first internal gear 4 rotates slower than the second internal gear 16. The first internal gear 4 is sleeved, externally, by the rotating disk 1 which has a ladder-like interior and exterior. The second internal gear 16 having a smooth internal circumferential surface is sleeved on external circumferential surface of the rotating disk 1. The first and second internal gears 4,16 can be rotated freely therebetween.

Figure 3:
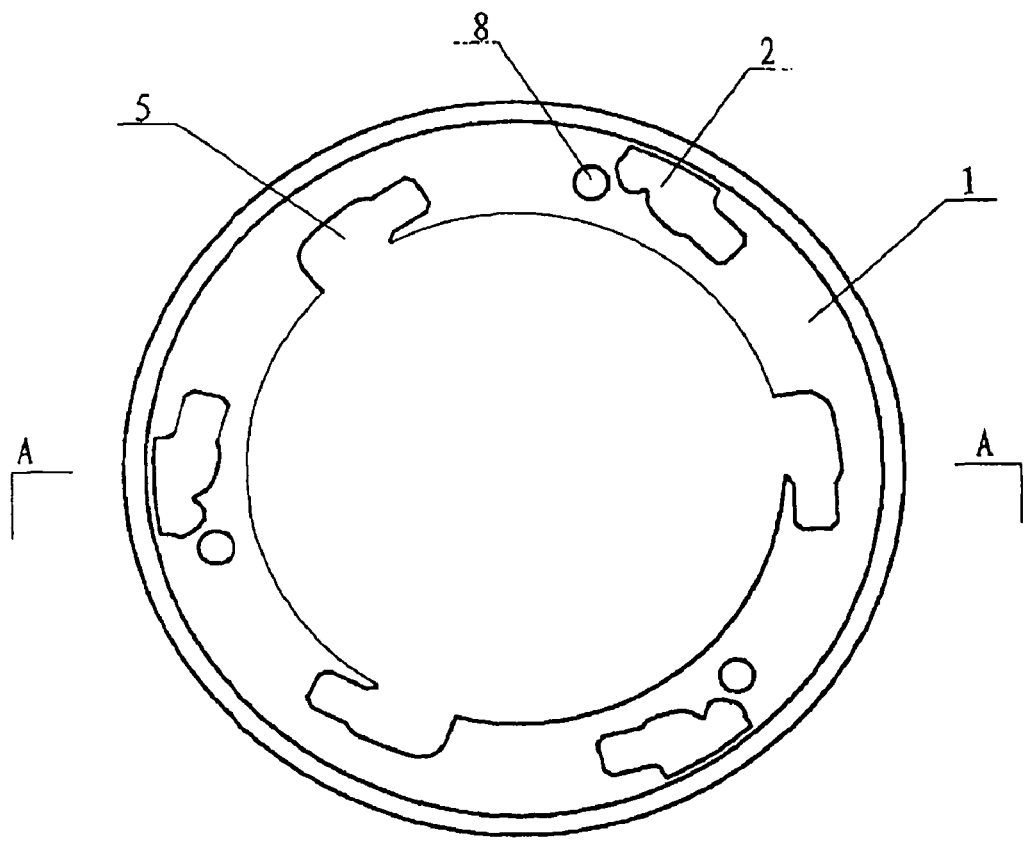
Figure 4:
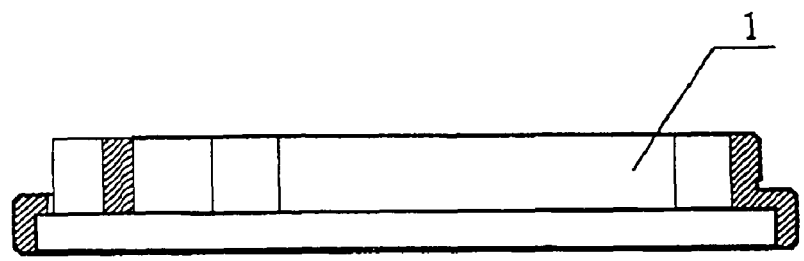
FIG. 4 is a cross-sectional view taken along cutting line A-A of FIG. 3.

As shown in FIGS. 2 to 4, a clutch device of the automatic transmission for an electric vehicle hub, according to the present invention, includes the rotating disk 1, the fly weights 3, and the annular link 30. The rotating disk 1 is provided with three recesses 2 which are 120° equiangularly spaced from one another, where the recesses 2 each has one end wider than the other end. A steel pin 9 is received in the recess 2, and a spring 10 is received in the wider end of the recess 2, where the spring 10 biases against the steel pin 9. The steel pin 9 is located in the recess 2 and at the narrower end, and is touched by a ratch 11 of the fly weight 3. A fly weight pivot 13 is fixed to a hole 8 provided on the rotating disk 1 and adjacent to the narrower end of the recess 2, such that the fly weight 3 can pivot about the pivot 13. A spring piece 17 is, at one end, fixed on top of the fly weight 3, and at the other end, abut against internal circumferential surface of the rotating disk 1. The rotating disk 1 is, at the internal circumferential surface, provided with three recesses 5 equally spaced from one another at 120 degrees, where each of the recesses 5 is also wider at one end than the other. A steel pin 6 is disposed in each of the recesses 5, and a spring 7 is disposed at the wider end of the recess 5 so as to bias against the steel pin 6. The steel pin 6 is disposed at the narrower end of the recess 5, and keeps contact with exterior surface of the first internal gear 4 which is sleeved by the rotating disk 1.

Figure 5:
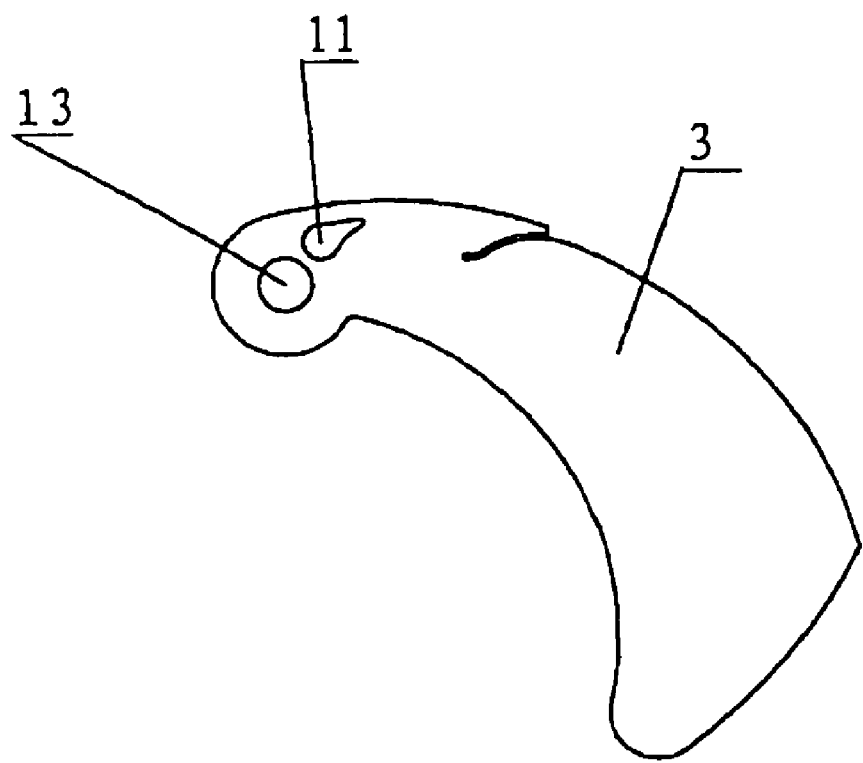
FIG. 5 is a front elevational view illustrating the fly weight according to the present invention.
Figure 6:
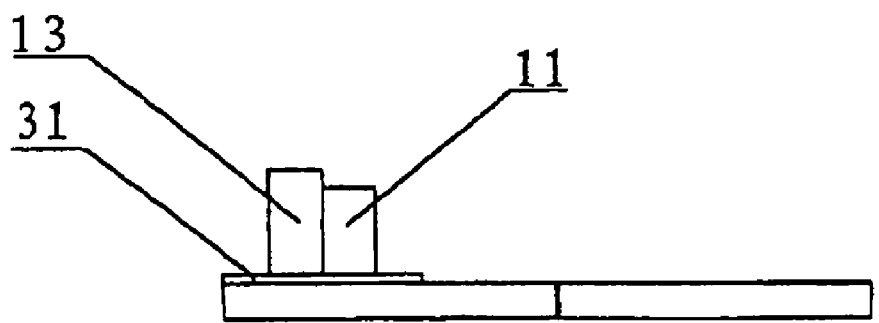
FIG. 6 is a side elevational view illustrating the fly weight according to the present invention.
Figure 7:
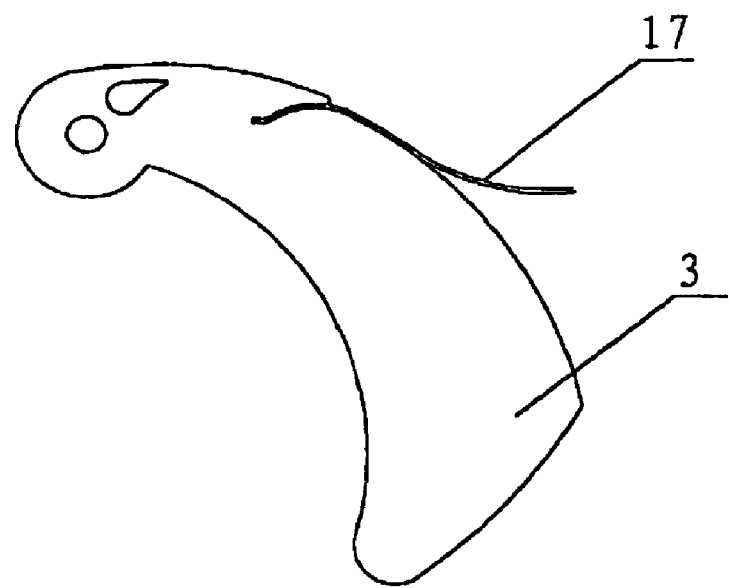
FIG. 7 is a schematic view illustrating assembly of the fly weight and a spring piece as shown in FIG. 2.
Figure 8:
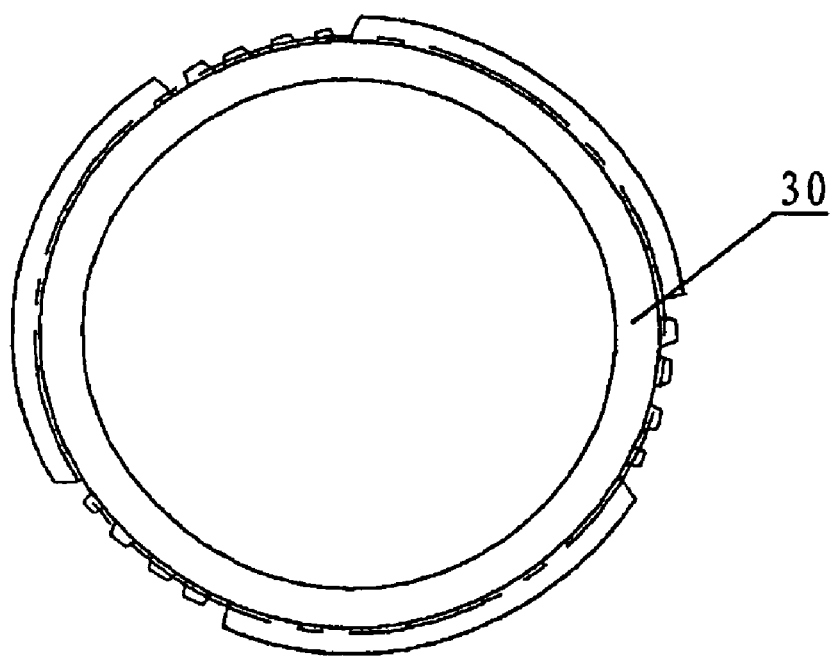
FIG. 8 is a schematic view illustrating an annular link as shown in FIGS. 1 and 2.

Referring to FIGS. 5 to 7, showing structures of the fly weight 3 and the spring piece 17 of the automatic transmission according to the present invention, the fly weight 3 is shaped as a curved knife having a wider end and a narrower end, where the narrower end is disposed with the fly weight pivot 13 to which a pinion 31 is fixed. Three pinions 31 are engaged, respectively, with one of three segments of teeth each disposed on circumference of the annular link 30. If necessary, the annular link 30 may fully be provided with teeth on circumference thereof (see FIG. 8). The ratch 11 is disposed adjacent to the fly weight pivot 13, where the ratch 11 and the fly weight pivot 13 stretch at the same direction, and the spring piece 17 is, at one end, pierces into, and fixed to back of the fly weight 3.

The automatic transmission for an electric vehicle hub, according to the present invention, can be implemented as follows:

The external motor rotor 25 drives the sun gear 23, which is fixed to the external motor rotor 25, for rotation. Since the sun gear 23 is engaged with the second planet gears 20, the first planet gears 19, which are fixed to the corresponding second planet gear 20, can also be rotated. The first planet gears 19 and the first internal gear 4 are engaged with each other, and so are the second planet gears 20 and the second internal gear 16. However, since the first internal gear 4 has an internal diameter less than that of the second internal gear 16, the first internal gear 4 rotates slower than the second internal gear 16. Further, since the steel pins 6 disposed in the three recesses 5 of the internal circumferential surface of the rotating disk 1 are biased by the springs 7 against the external surface of the first internal gear 4, the first internal gear 4 drives the rotating disk 1 for a slow rotation. On the other hand, the steel pins 9 in the three recesses 2 of the external circumferential surface of the rotating disk 1 are pressed down by the ratches 11 of the fly weight 3 so as to be disengaged from an internal circumferential surface of the second internal gear 16, making the second internal gear 16 idle running. When the automatic transmission, according to the present invention, reaches to a predetermined rpm, the three fly weights 3, under the action of centrifugal force, pass off engagement with the annular link 30 and overcome resistance of the spring pieces 17. As such, the fly weight 3 extends outward, due to the centrifugal force, and the ratches 11 are lifted up. The ratches 11 release the pressure against the steel pins 9, making the steel pins 9 return to the narrower ends of the recesses 2. The steel pins 9 touch the spring pieces 17 at the second internal gear 16 which run speedily. The spring piece 17 is, at one end, disposed at the top of the fly weight 3, and at the other end, abut against the internal circumferential surface of the rotating disk 1, so that the rotating disk 1 can be rotated speedily. Since the hub 24 is fixed to exterior of the rotating disk 1, speedy rotation of the hub 24 can be expedited. Whereas since the first internal gear 4, which rotates slowly, stays at an overdrive engagement with the steel pins 6 at the recesses 5 of the internal circumferential surface of the rotating disk 1, the first internal gear 4 is disengaged from the rotating disk 1. In case resistance increases and speed decreases, controlling handle or switch can be shifted backward, and re-started. This will make the fly weights 3 subject to action of the spring pieces 17, due to decrease of the centrifugal force, and return to an initial position, and pass over depression of the ratches 11, so that the steel pins 9 can be fully disengaged from the internal circumferential surface of the second internal gear 16. As a result, the automatic transmission, according to the present invention, can achieve the purpose of automatic speed increase or decrease.

Further, in order to ensure stability between the sun gear 23 and the planet gears 19,20, and between the planet gears 19,20 and the internal gears 4,16, and to avoid the possibility of disengagement therebetween, grooves 41,43 are provided on the faces of corresponding gears engaged with each other, where rings 42 are disposed in the grooves 41,43.

Although the present invention has been explained in relation to its preferred embodiments, it is to be understood that many other possible modifications and variations can be made without departing from the scope of the invention as hereinafter claimed.

What is claimed is:

1. An automatic transmission for an electric vehicle hub, comprising:
   an external motor rotor fixedly connected with a motor shaft;
   a sun gear;
   at least three first planet gears which are arranged circumferentially around the sun gear; and
   at least three corresponding second planet gears coaxially fixed with the respective first planet gears;
   wherein the first and the second planet gears are respectively engaged and transmitted along with first and second internal gears, and the second internal gear has a diameter greater than that of the first internal gear; and
   wherein a rotating disk is arranged between external circumferential surface of the first internal gear and internal circumferential surface of the second internal gear, and a hub is fixed to exterior of the rotating disk; and
   the automatic transmission further comprising:
   a clutch device, making the rotating disk and the external circumferential surface of the first internal gear contact with each other for a transmission of slower rpm, and when the rpm reaches critical, making the rotating disk and the internal circumferential surface of the second internal gear contact with each other at a high-speed rotation.

2. The automatic transmission for an electric vehicle hub as claimed in claim 1, wherein internal and external circumferences of the rotating disk are, symmetrically, provided with at least one recess receiving a spring and a steel pin, and wherein the rotating disk is connected with at least one fly weight having a pinion and a spring piece, and an annular link engaged with the pinion.

3. The automatic transmission for an electric vehicle hub as claimed in claim 2, wherein there are three recesses provided at the internal and external circumferences of the rotating disk symmetrical with and spaced from one another at 120°.

4. The automatic transmission for an electric vehicle hub as claimed in claim 3, wherein there are grooves provided, between corresponding gears, among the sun gear, the first planet gears, the second planet gears, the first internal gear, and the second internal gear, and wherein rings are disposed in the grooves.

5. The automatic transmission for an electric vehicle hub as claimed in claim 2, wherein the annular link is provided, symmetrically, with full teeth.

6. The automatic transmission for an electric vehicle hub as claimed in claim 5, wherein there are grooves provided, between corresponding gears, among the sun gear, the first planet gears, the second planet gears, the first internal gear, and the second internal gear, and wherein rings are disposed in the grooves.

7. The automatic transmission for an electric vehicle hub as claimed in claim 2, wherein the annular link is provided, symmetrically, with curved teeth.

8. The automatic transmission for an electric vehicle hub as claimed in claim 7, wherein there are grooves provided, between corresponding gears, among the sun gear, the first planet gears, the second planet gears, the first internal gear, and the second internal gear, and wherein rings are disposed in the grooves.

9. The automatic transmission for an electric vehicle hub as claimed in claim 2, wherein there are grooves provided, between corresponding gears, among the sun gear, the first planet gears, the second planet gears, the first internal gear, and the second internal gear, and wherein rings are disposed in the grooves.

10. The automatic transmission for an electric vehicle hub as claimed in claim 1, wherein there are grooves provided, between corresponding gears, among the sun gear, the first planet gears, the second planet gears, the first internal gear, and the second internal gear, and wherein rings are disposed in the grooves.

* * * * *